United States Patent [19]

Tsuchiya et al.

[11] Patent Number: 5,722,285
[45] Date of Patent: Mar. 3, 1998

[54] CALIPER SENSOR

[75] Inventors: Akihiko Tsuchiya; Yutaka Saito; Kazunori Onozawa, all of Tokyo, Japan

[73] Assignee: Yokogawa Electric Corporation, Tokyo, Japan

[21] Appl. No.: 688,434

[22] Filed: Jul. 30, 1996

[30] Foreign Application Priority Data

Oct. 27, 1995 [JP] Japan .................................. 7-280420

[51] Int. Cl.⁶ .................................................. G01B 7/06
[52] U.S. Cl. ...................................... 73/159; 324/231
[58] Field of Search .............................. 73/159, 865.8; 324/228–231; 271/262, 263; 162/263

[56] References Cited

U.S. PATENT DOCUMENTS 4,936,141  6/1990  Anderson, Jr. et al. .
5,074,050  12/1991  Williams .............................. 73/159
5,075,979  12/1991  Foskett ............................... 324/231

Primary Examiner—Robert Raevis
Attorney, Agent, or Firm—Moonray Kojima

[57] ABSTRACT

A caliper sensor of the opposing contact type, wherein are provided target supporting spherical surfaces comprising at least three spherical surfaces disposed on a periphery of a target facing plane of a sliding surface and a plane determined by the tops of each spherical surface and in contact in parallel with a measurement reference plane above the target; and contact spherical surfaces for the reference plane outside the target facting plane of the sliding surface, whose number is equal to or greater than that of the relevant target supporting spherical surfaces and the tops of each spherical surface having a height about equal to the relevant target supporting spherical surfaces, so that contaminants are steered away from the tops of the spherical surfaces and the measurement process is thereby unaffected by the contaminants for a long period of time.

7 Claims, 3 Drawing Sheets

CALIPER SENSOR

BACKGROUND OF THE INVENTION

1. Field of Invention

This invention relates to a caliper sensor for measuring the caliper or thickness of paper or sheets produced by a paper making machine and/or coating machine; and more particularly, to improvements in such sensor for measuring the caliper of paper with an opposing contact type caliper sensor.

2. Description of the Related Art

There are two types of caliper sensors (1) a one side floating caliper sensor to which the principle of air bearing is applied; and (2) an opposing contact caliper sensor which utilizes a target such as made of ceramic, or the like. One example of the former is disclosed in Japan Laid Open Patent Application SN 88/308,503, and minimizes the frequency at which perforations or sheet breaks occur even though foreign matter may become mixed in the paper sheet. One example of the latter is disclosed in Japanese Laid Open UM 90/128,910 and because the sensor ends contact both sides of the paper has the ability to make correct measurements without being affected by paper tension and/or warping up to the end of the sheet.

FIGS. 1(A) and 1(B) depict a conventional opposing contact type caliper sensor, wherein FIG. 1(A) is an elevational view, and FIG. 1(B) is a plan view of a sliding surface. Target 10 is made of a metal, and eddy current is generated therein. Target 10 is positioned against the paper being measured for thickness or caliper with a very weak force. Note that herein the word caliper is used interchangeably with the word thickness. Lower block 20 is a structure for supporting sensor coil 40 and sliding surface 30. Sliding surface 30 employs a material which is excellent in abrasive resistance, such as glass or ceramic, and has low resistance for smooth paper flow. Sensor coil 40 incorporates a coil which carries a high frequency current generating eddy current in target 10.

In the device, the paper caliper or thickness is measured as the distance between target 10 and sliding surface 30. Flux in sensor coil 40, and thus, coil inductance decreases with the eddy current generated in target 10. The paper thickness is then detected as an inductance change in coil 40.

However, if the prior device is used with paper of low quality pulp, such as cardboard and scrapped corrugated fiberboard, a problem occurs in that dirt or other contaminant sticks to the sliding surface 30 and prevents correct measurement of the caliper.

SUMMARY OF THE INVENTION

Accordingly, an object of the invention is to overcome the aforementioned and other problems, disadvantages and deficiencies of the prior art.

Another object is to provide a caliper sensor which can continuously and correctly measure caliper of all types of paper, including those of low quality.

The foregoing and other objects are attained in the invention which encompasses a sensor wherein target supporting spherical surfaces are provided comprising at least three spherical surfaces disposed on the periphery of a target facing plane of the sliding surface and a plane determined by the tops of each spherical surface and contacting the foregoing in parallel with the measurement reference plane of the target; and contact spherical surfaces are provided for the reference plane outside the target facing plane of the sliding surface, and having a number equal to or greater than that of the relevant target supporting spherical surfaces and the tops of each spherical surface having a height about equal to that of the relevant target supporting spherical surfaces. The caliper sensor in which the foregoing spherical surfaces are constructed further comprises a target which has the measurement reference plane contacting the paper being measured on its upper surface, a sliding surface facing the target with the paper between the two, and a sensor coil positioned under the sliding surface and carrying a high-frequency current which generates an eddy current on the measurement reference plane of the target.

In the embodiment, the target supporting spherical surfaces support the measurement reference plane of the target. No gaps are made in either the upper or lower surface of the paper being measured. The paper being measured is disposed between the target and the target supporting spherical surfaces to make the paper flat near the target supporting spherical surfaces and the contact spherical surfaces become the reference plane. Since both the target supporting spherical surfaces and the contact spherical surfaces are spherical, it is difficult for any contaminants to stick to these surfaces during the measurement process. Rather the contaminants would tend to go toward the areas between the spheres, and hence the contaminants would not interference, with the measurement or cause errors therein. On the other hand, if the contaminant does for some reason stick to the surface, the contaminants can be readily and easily removed.

DETAILED DESCRIPTION OF THE PREFERRED EMBODIMENTS

Figure 1A:
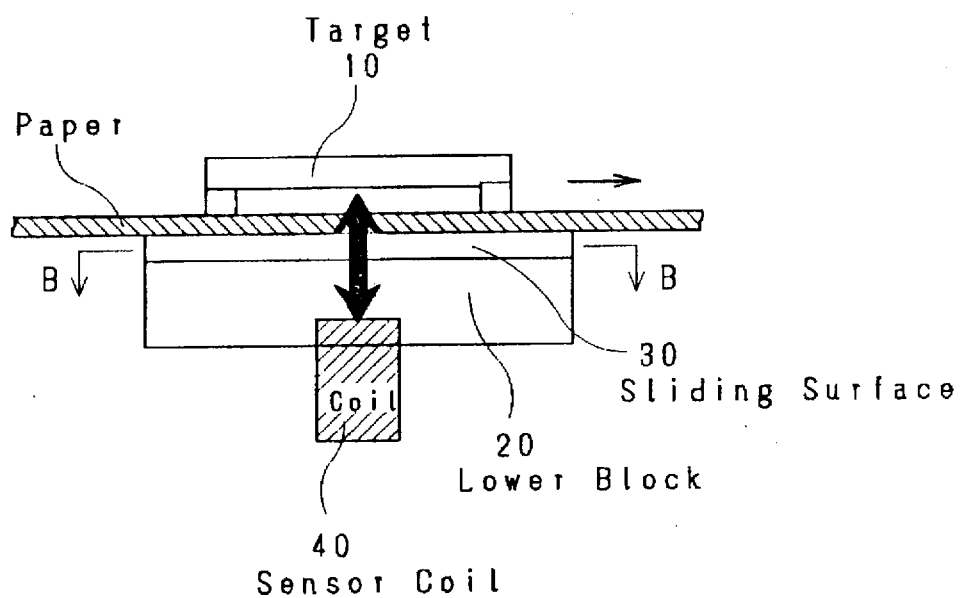
FIGS. 1(A) and 1(B) depict a conventional opposing contact type caliper sensor.
Figure 1B:
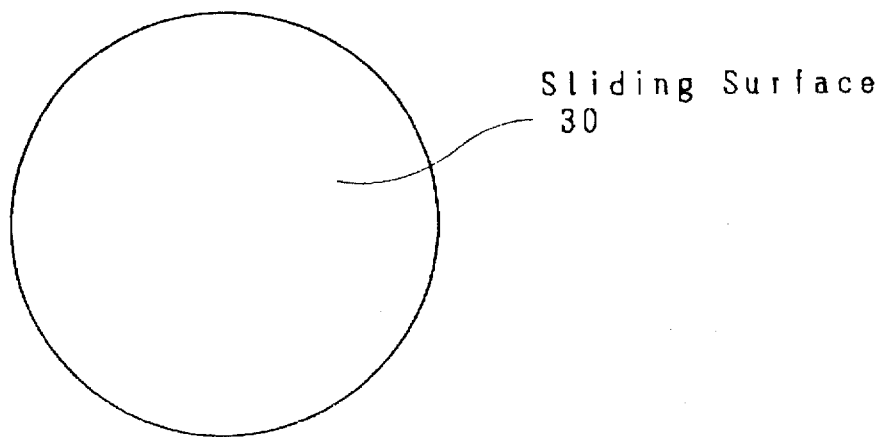
Figure 2A:
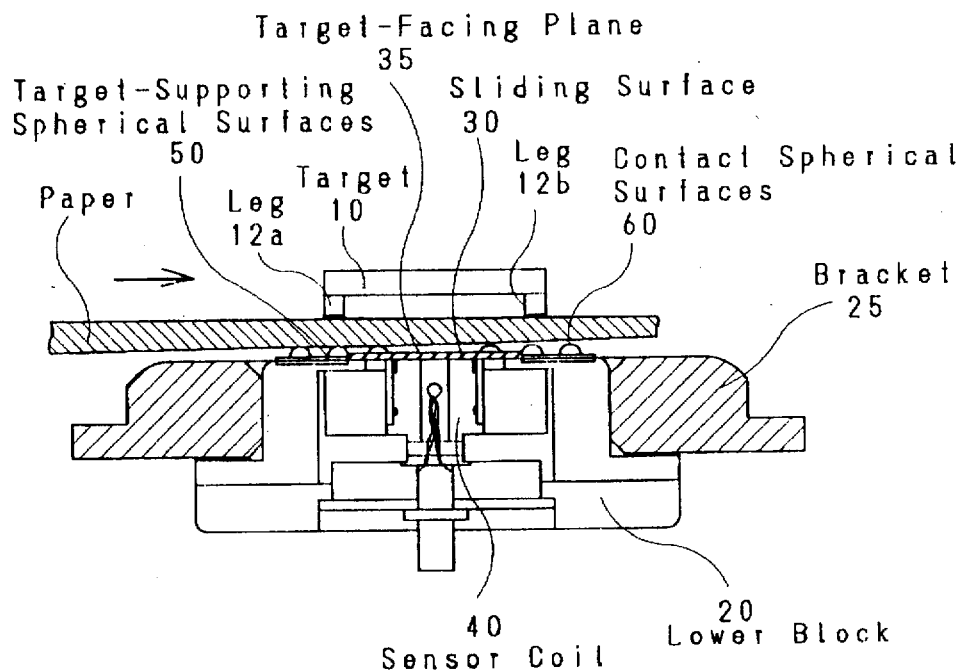
FIGS. 2(A) and 2(B) depict an illustrative embodiment of the invention.
Figure 2B:
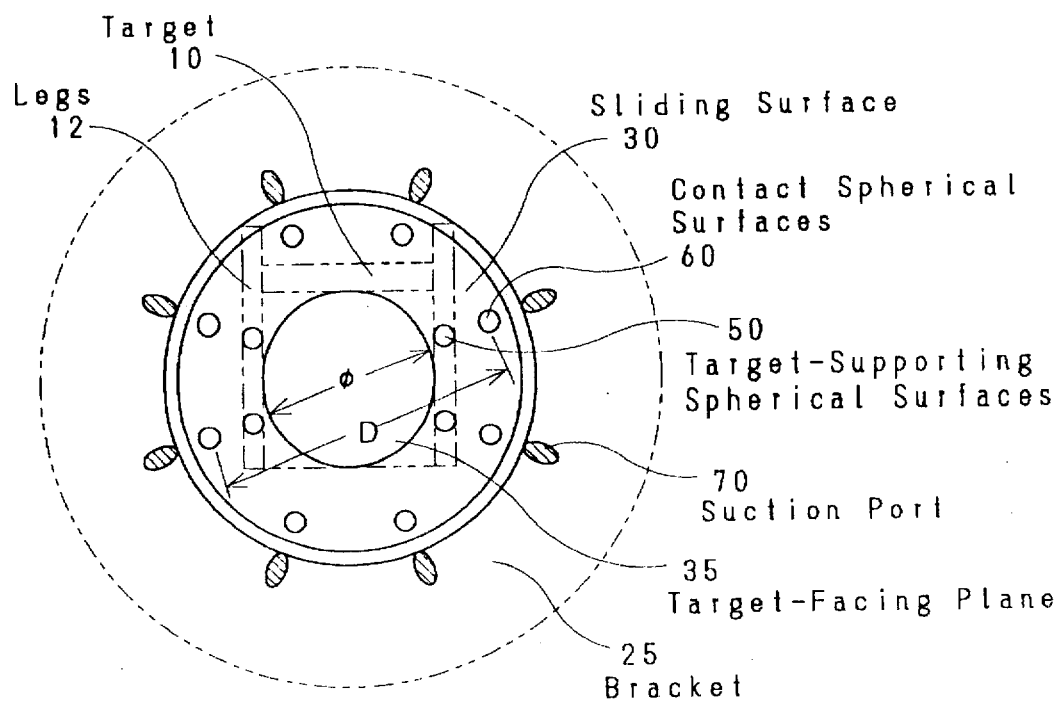

FIGS. 2(A) and 2(B) show an illustrative embodiment of the invention, wherein FIG. 2(A) is a cross-sectional view, and FIG. 2(B) is a plan view of a sliding surface. The same components as in FIGS. 1(A) and 1(B) have the same notations and are not described hereat for sake of brevity and clarity.

Bracket 25 is a structure that holds circular sliding surface 30 at the circumference and smoothes the paper flow and is supported by lower block 20 and controls the paper flow so that the measurement can be accurately implemented. Target facing plane 35 is provided at the center of sliding surface 30, under which sensor coil 40 is positioned and above which target 10 is positioned with the paper disposed therebetween. The target facing plane 35 is a circle of diameter $\phi$ (e.g. 25 mm) and is made slightly smaller than rectangular target 10 when the target is projected onto sliding surface 30. The target facing plane 35 maybe a part of sliding surface 30.

Target 10 comprises legs 12($a$) and 12($b$) on its periphery on the side facing sliding surface 30. Leg 12$a$ is disposed on the upstream side of the paper-flow and leg 12$b$ is disposed on the downstream side of the paper flow and contact the paper at two places between the target surface facing sensor coil 40. Since legs 12($a$) and 12($b$) are attached to target 10 in a manner approximately perpendicular to the direction of paper flow, the target 10 surface (i.e. bottom of legs 12$a$ and 12$b$) facing coil 40 follows the paper caliper in a stable manner.

Target supporting spherical surfaces 50 (see FIG. 2(B)) comprise four spherical surface provided outside the periphery of target facing plane 35 and the tops of each target supporting spherical surface are positioned counter to legs 12(a) and 12(b) with the paper (see FIG. 2(A)) to be measured being disposed therebetween. This maintains a plane formed by the tops of each spherical surface 50 and a measurement plane formed by the bottoms of legs 12(a) and 12(b) of target 10 in parallel with each other and enables the paper thickness to be measured accurately by coil 40.

Contact spherical surfaces 60 comprise eight spherical surfaces provided outside target facing plane 35 of sliding surface 30 and their tops are designed to have a height approximately equal to that of the tops of the target supporting spherical surfaces 50. The surfaces 60 are arranged on the circumference of a circle of diameter D (e.g. 40 mm) and spaced equally.

The number of spherical surfaces 50 and 60 may be varied as desired.

The tops of both types of spherical surfaces 50 and 60 may be of equal height and form the same plane, or be slightly different. The plane formed by the tops of spherical surfaces 50 and located facing the target 12 is used in the measurement by sensor 40. The tops of surfaces 60 are used to hold the object, such as paper, being measured. It is preferred that the tops of both surfaces 50, 60 be the same. Also, the spherical surfaces 50 and 60 may be formed in the locations shown and on top of and part of sliding surface 30. The plane formed by the tops of surfaces 50 may be referred to as a reference plane, with the bottoms of legs 12a, 12b forming a measurement plane, with the object being measured disposed therebetween.

Also, eight suction ports 70 are provided equally spaced on the circumference of the circle close to spherical surfaces 60 on bracket 25, as shown. The ports 70 in operation cause paper to stick to contact spherical surfaces 60 by blowing air in parallel with sliding surface 30 and toward the outside, thereby generating a descending current to sliding surface 30. That is to say, air is directed radially outwardly, as shown in FIG. 2(B), from the center of target facing plane 35, so as to create a pressure depression at the circular sliding surface 30. The air is directed outwardly and in parallel with the sliding surface. In this manner, the object being measured will be drawn close to sliding surface 30. The suction ports 70 are shown only in FIG. 2(B) and omitted from FIG. 2(A) for sake of convenience of description. It is also noted that the inner concentric circle in FIG. 2(B) represents the edge of sliding surface 30, and the outer concentric circle represents the edge of lower block 20.

The operation of the sensor is as follows. Paper is positioned between target 10 and sliding surface 30 and is moved at a high speed of several thousand meters per minute in the direction of flow in a paper making machine, for example. The paper contacts the tops of spherical surfaces 60, which acts as a holding plane, by action of the air through suction ports 70, and becomes flat inside the target supporting spherical surfaces 50 i.e. above target facing plane 35. Target 10 contacts the paper and the position of its measurement, plane formed of the bottoms of legs 12a, 12b, moves corresponding to the paper thickness. Accordingly, an accurate paper caliper or thickness can be readily measured by measuring the distance between target 10 with coil. 40.

The case where low quality pulp in paper causes contaminants to stick to the surroundings will now be described. Contaminants, such as dirt, adhere on target supporting spherical surfaces 50 and contact spherical surfaces 60. But, the contaminant does not adhere to the tops of such spherical surfaces. Rather the contaminant tends to accumulate around the non-top or lower part of the spherical surfaces, due to the small gaps corresponding to the heights of the spherical surfaces between such spherical surfaces and the sliding surface. Hence, no errors of measurements are caused in the thickness measurements due to existence of contaminants. Also, since the spherical surfaces are made of a material from which dirt is easily removed, such as glass or ceramic, longer continuous measurement can be performed than in the prior art because dirt or other contaminant removal is easily facilitated. Also, since the contaminant tends to accumulate away from the tops of the spherical surfaces, the time between cleaning is extended considerably and measurement duration between cleaning is extended considerably so that expense of measurement is substantially reduced.

Figure 3:
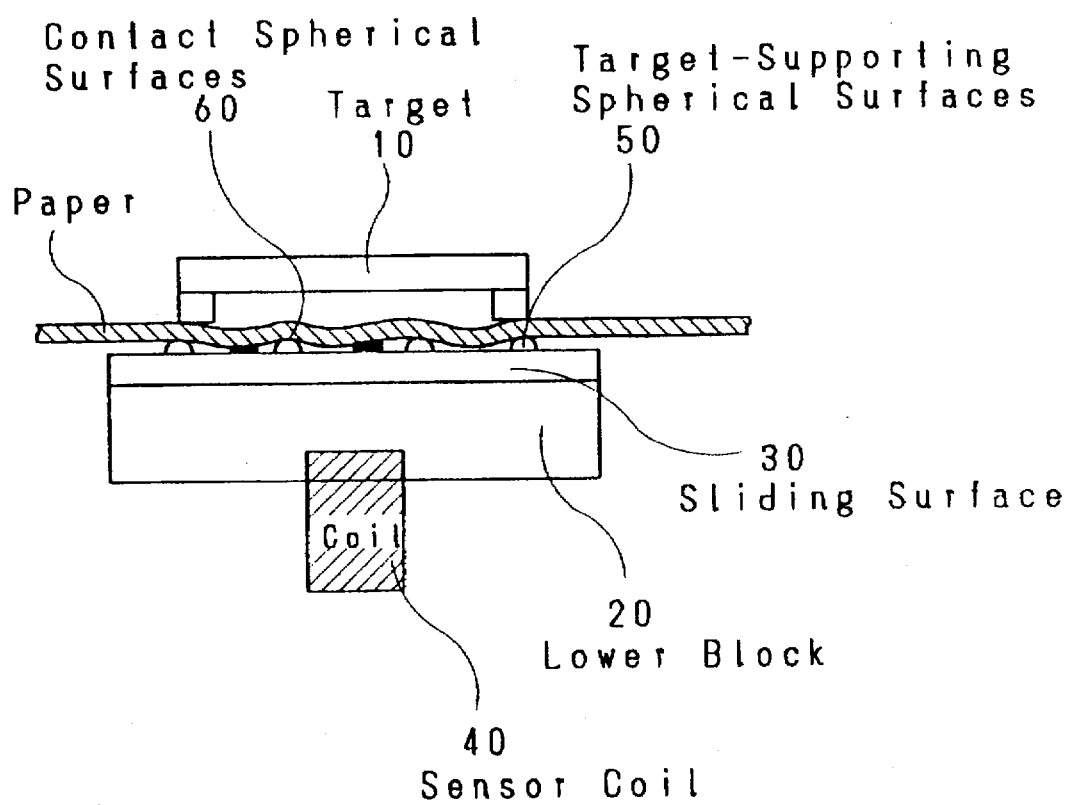
FIG. 3 is an elevational view depicting measurement of a thin flexible paper.

FIG. 3 illustrates the case of measurement of a thin and flexible paper. If the stiffness of the paper is only slight, e.g. in the case where no tension exists, such as when a standard paper thickness is used to calibrate the thickness measurement data, uneven wrinkles are produced and the paper may be uneven in the position facing target 10. However, for such thin paper, since the paper is moving at high speed, the production of wrinkles can be prevented by increasing the number of suction ports 70, contact spherical surfaces 60 and target supporting spherical surfaces 50. That is to say, as desired, the number of spherical surfaces 50 and 60, and ports 70, can be changed as desired with the desired effects in mind.

As described, the invention enables accurate measurement of paper thickness because the peripheral surfaces cause the paper to become substantially flat in the device when measurement is being undertaken. Also, because of the shape of the spherical surfaces, the contaminants, if any, will tend not to adhere to the tops of surfaces, which would cause errors, but, rather tend to accumulate toward the bottom of the spherical surfaces, which eliminates the possibility of measurement error due to contaminants. Advantageously, this also enables the duration of continuous measurement to be extended for long periods of time, since cleaning will not be required until the accumulation reaches the top of the spherical surfaces. Accordingly, not only is the production line extended, but also, the maintenance is reduced.

Moreover, by the action of the suction port 70, which causes generation of a descending air flow to sliding surface 30, the paper is made to contact contact spherical surface 60 which acts as a reference plane. Thus, accuracy of thickness measurement is improved.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A caliper sensor comprising:
    a target having a measurement plane in contact with an object to be measured;
    a sliding surface facing said target with said object disposed therebetween;
    a sensor coil positioned under said sliding surface, which carries a high frequency signal and generates an eddy current in said measurement plane of said target;
    a plurality of target supporting spherical surfaces comprising at least three spherical surfaces provided on a periphery of a part of said sliding surface facing said target and forming a plane determined by tops of each target supporting spherical surface; and a plurality of contact spherical surfaces disposed outside said plurality of said target supporting spherical surfaces and above said sliding surface, and comprising a number of spherical surfaces equal to or greater in number than said target supporting spherical surfaces, and having tops of each contact spherical surface of a height equal to that of said target supporting spherical surfaces, wherein said object is disposed on said tops of said target supporting spherical surfaces and on said tops of said contact spherical surfaces.

2. The sensor of claim 1, wherein said target comprises two legs positioned on an upstream and downstream side of said object with said object being disposed between said legs of said target and said part of said sliding surface facing said target, and wherein said two legs contact said object in a manner perpendicular to the direction of flow of the object.

3. The sensor of claim 2, wherein said target supporting spherical surfaces comprise at least two spherical surfaces disposed counter to said leg positioned on said upstream side, and at least two other spherical surfaces disposed counter to said leg positioned on said downstream side.

4. The sensor of claim 1, wherein said sliding surface comprises a target facing plane of a circular shape of diameter φ; and comprises eight spherical surfaces arranged equally spaced on a circumference of a circle of diameter D which is larger than the diameter φ of said target facing plane.

5. A caliper sensor comprising:

a target having a measurement plane in contact with an object to be measured;

a sliding surface facing said target with said object disposed therebetween;

a sensor coil positioned under said sliding surface, which carries a high frequency signal and generates an eddy current in said measurement reference plane of said target;

a plurality of target supporting spherical surfaces comprising at least three spherical surfaces provided on a periphery of a surface of said sliding surface facing said target and a plane determined by tops of each spherical surface and in contact therewith in parallel with said measurement plane of said target;

a plurality of contact spherical surfaces disposed outside said target and facing a surface of said sliding surface, and comprising a number of spherical surfaces equal to or greater in number than said target, supporting spherical surfaces, and having tops of each spherical surface having a height equal to that of said target supporting spherical surfaces; and means for generating air flow in a direction perpendicular to an axis of said sensor coil to said sliding surface.

6. The sensor of claim 5, wherein said means for generating comprises a plurality of suction holes disposed outside said contact spherical surfaces on said sliding surface, and means for blowing air through said such holes in a direction toward outside of said sensor coil.

7. The sensor of claim 6, wherein said suction holes are provided close to said contact spherical surfaces, and are of a number corresponding to a number of said contact spherical surfaces.

* * * * *